No. 657,137. Patented Sept. 4, 1900.
M. L. SHIVELY.
NUT LOCK.
(Application filed May 18, 1900.)

(No Model.)

UNITED STATES PATENT OFFICE.

MARTIN L. SHIVELY, OF HELENA, OHIO, ASSIGNOR OF ONE-HALF TO TITUS GARN, OF SAME PLACE.

NUT-LOCK.

SPECIFICATION forming part of Letters Patent No. 657,137, dated September 4, 1900.

Application filed May 18, 1900. Serial No. 17,135. (No model.)

*To all whom it may concern:*

Be it known that I, MARTIN L. SHIVELY, a citizen of the United States, residing at Helena, in the county of Sandusky and State of Ohio, have invented a new and useful Nut-Lock, of which the following is a specification.

This invention relates to nut-locks, and has for its object to provide an improved construction of nut which is applicable to any common or ordinary bolt without altering or changing the latter and is provided with means whereby the nut may be locked against accidental unscrewing after it has been set to its proper place. It is furthermore designed to provide a device of this character which does not damage the threads or other parts of the nut and bolt, so that a single device may be used a plurality of times.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
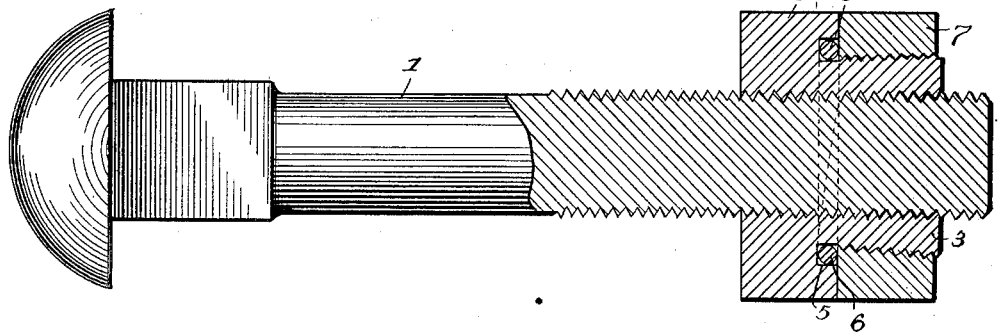
Figure 2:
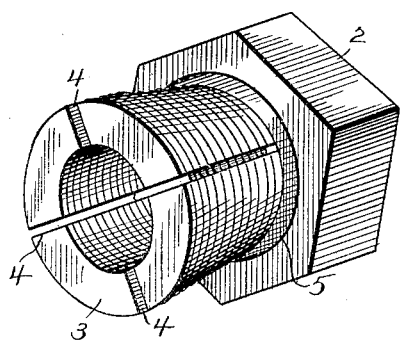
Figure 3:
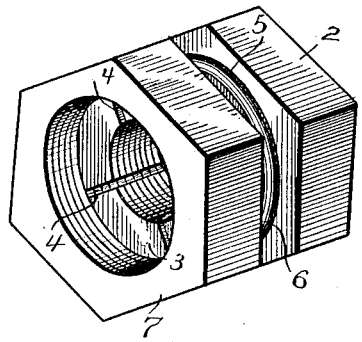

In the drawings, Figure 1 is a longitudinal sectional view of a bolt having the improved nut applied thereto. Fig. 2 is a detail perspective view of the nut proper with the binding or locking member removed. Fig. 3 is a perspective view of the complete device.

Corresponding parts are designated by like characters of reference in the figures of the drawings.

Referring to the drawings, 1 designates an ordinary bolt to which the present nut 2 is fitted. This nut is formed with a central boss or extension 3, which projects from the outer face thereof and through which the screw-threaded bore of the nut extends, while the outer side of the boss is provided with screw-threads which are arranged reversely to those of the bore; also, this boss flares outwardly and is split or provided with a plurality of longitudinal slots or incisions 4, so as to form segmental spring-fingers which diverge outwardly.

At the base of the extension or boss there is provided an annular groove 5, which is formed in the face of the nut and is adapted to receive a coiled or split spring washer 6. Fitted to the boss or extension is a binding nut or member 7, which normally remains upon the nut and completes the device. This binding-nut is of the same diameter as the main nut and has a thickness substantially equal to the length of the boss 3, so that the device presents no external projections. The threaded bore of the binding-nut 7 is flared outwardly, corresponding to the flare of the boss or extension of the nut 2.

In the application of the device the nut 2, carrying the binding member, is fitted to the bolt and set to the desired position, the binding nut or member being flush against the outer face of the nut 2, so that the segmental spring-fingers may not bind upon the bolt. Then the binding-nut is turned so as to be fed outwardly upon the boss, thereby drawing the spring-fingers inwardly by reason of the flare of the boss, and thus binding the fingers firmly upon the bolt to prevent accidental turning of the nut. It will now be understood that the spring-washer is interposed between the two nuts or members, so as to prevent accidental turning of the binding-nut, and the washer is fitted in a groove, so that it may permit of the binding-nut being set up against the other nut, in order that the spring-fingers may normally assume their outwardly-deflected limit and permit of the device being fitted to the bolt. It is preferable to have both nuts of the same diameter, so that the wrench may span both nuts when the device is being applied to the bolt and then may be slipped outwardly from the nut proper, so as to turn the binding-nut outward from the nut 2 and cause the binding-nut to contact and bind the spring-fingers upon the bolt. Owing to the reverse directions of the interior and exterior screw-threads on the boss of the nut 2 the latter when the wrench is slipped therefrom onto the binding-nut 7 remains in place while the binding-nut is being run out to contract the spring-fingers of the boss.

From the foregoing description it will be apparent that the present invention provides a complete article of manufacture which is applicable to any common or ordinary form of bolt, and therefore it is designed to manufacture the device in sizes to fit the bolts now in common use. The spring-washer is designed to bear in opposite directions against the adjacent faces or ends of the two members or nuts, so as to effectually prevent loosening of the binding-nut, and by reason of the groove in the main nut the spring is housed therein when the two nuts are in contact. This latter feature is highly important, as the two nuts are normally in contact, and thus the spring is protected against being broken or lost while in storage or during transportation and also when the nut is being fitted to a bolt, as the spring is exposed only after the binding-nut has been drawn away or separated from the main nut.

What is claimed is—

As a new article of manufacture, the nut-lock comprising the nut 2, having the centrally-disposed boss or extension on one side thereof, said boss or extension being flared outward, externally, split to form diverging spring-fingers, and having reversely-disposed interior and exterior screw-threads, and said nut 2 having the annular groove 5 in its outer face, the spring-washer, disposed in said groove, and the binding-nut 7, the latter being screwed on the threaded boss or extension of nut 2, normally in contact with said nut, and having the counterflared threaded bore, adapted to the flared boss or extension, all constructed and adapted to operate substantially as described.

In testimony that I claim the foregoing as my own I have hereto affixed my signature in the presence of two witnesses.

MARTIN L. SHIVELY.

Witnesses:
GEO. W. HOUSY,
J. H. BOWSER.